United States Patent [19]
Attermeyer

[11] Patent Number: 5,476,526
[45] Date of Patent: Dec. 19, 1995

[54] ADJUSTABLE FILTER FRAME AND GRID

[75] Inventor: Donald G. Attermeyer, Cincinnati, Ohio

[73] Assignee: Newtron Products Company, Cincinnati, Ohio

[21] Appl. No.: 242,370

[22] Filed: May 13, 1994

[51] Int. Cl.⁶ .................................................. B01D 46/00
[52] U.S. Cl. ........................................ 55/496; 55/DIG. 31
[58] Field of Search ................................ 55/496, 516, 517, 55/518, 490, 495, DIG. 31

[56] References Cited

U.S. PATENT DOCUMENTS

| | | | |
|---|---|---|---|
| 3,076,303 | 2/1963 | Durgeloh | 55/DIG. 31 |
| 3,509,696 | 5/1970 | Thompson | 55/518 |
| 3,774,377 | 11/1973 | Bishop | 55/DIG. 31 |
| 5,087,276 | 2/1992 | Snyder | 55/496 |
| 5,183,488 | 2/1993 | Deering | 55/DIG. 31 |
| 5,188,646 | 2/1993 | Nolen, Jr. | 55/496 |
| 5,364,458 | 11/1994 | Burnett et al. | 55/496 |

Primary Examiner—C. Scott Bushey
Attorney, Agent, or Firm—Wood, Herron & Evans

[57] ABSTRACT

This invention is directed to a user-sizable filter grid and an adjustable interlocking filter frame and grid system suitable for use in heating and cooling systems. The user-sizable grid is adapted to interlock with an adjustable frame, thereby holding a filter in the grid/frame assembly, and includes at least one member extending across at least one of the length and width of the frame. The member has interlocks for engaging a flange on the frame, thereby securing the frame and grid together. Examples of different types of interlocks include indentations, pincher-like grippers and projections, with the indentations being the preferred form. In the preferred embodiment, the grid includes a plurality of horizontal and vertical members that intersect one another, with indentations being distributed along the intersecting members so that the adjustable frame may engage the interlocks while accommodating various standard filter sizes.

18 Claims, 2 Drawing Sheets

ADJUSTABLE FILTER FRAME AND GRID

FIELD OF THE INVENTION

This invention relates to filters and frames used in heating and cooling systems and, more particularly, to an adjustable filter frame and grid system.

BACKGROUND OF THE INVENTION

Traditionally, air filters for heating and cooling systems have been provided in a frame having fixed dimensions. While these pre-sized filters and frames generally correspond to particular heating and cooling system size requirements, they offer no sizing flexibility. Because frame and filter sizes are fixed, vendors must stock a wide variety of sizes to accommodate different requirements. Furthermore, users are unable to make small adjustments in filter and frame size to accommodate particular applications. Therefore, it has been desirable to have adjustable filters and frames.

One solution for the need to provide adjustable filters and frames is provided in U.S. Pat. No. 5,087,276. That patent discloses an adjustable frame composed of four right angle members with each right angle member having two legs. Two of the right angle members are slightly reduced in size to be slidably received within the channels of the larger right angle members in a telescoping fashion. The filter is a multiple layer filter medium having a thin mesh support grid on one face. In order to keep the frame at the desired size, the user must insert keeper pins into holes that are variably spaced across the length and width of the frame. The keeper pins also are pushed through a perimeter portion of the thin mesh support grid to hold the filter in place.

The user-sizable furnace filter and frame assembly disclosed in the '276 patent has some limitations. For example, when the user initially sets or subsequently adjusts the frame, the pins may become separated from the rest of the assembly and lost. Also, the user must be very exacting in trimming the filter and thin mesh support grid. Therefore, it is desirable to have a user adjustable filter frame and grid system that is easy to adjust, and in which the size of the adjustable frame may be set and the filter secured in place without the use of small parts that may become separated from the system and lost.

SUMMARY OF THE INVENTION

Limitations of the '276 patent are overcome by a frame and grid built in accordance with the principles of the present invention. The inventive frame and grid interlock with one another to secure a filter within the frame and grid assembly.

A frame and grid system built in accordance with the principles of the present invention includes: (1) a channel member having a U-shaped sidewall and first and second ends, the first and second ends being joined to one another to form a frame having a length and width, the U-shaped sidewall terminating in a flange, and (2) a grid comprising a first member extending across at least one of the length and width of the frame, the first member having first and second ends and a plurality of interlocks, one of the interlocks being proximate the first end and a second one of the interlocks being proximate the second end so that the flange of the U-shaped sidewall engages the interlocks proximate the first and second ends of the first member to secure the frame to the grid.

In the preferred embodiment, the grid includes a plurality of horizontal members and vertical members that intersect one another. Each member has indentations located on the member so the grid interlocks with a flange extending from a filter frame. So that the grid may be used with adjustable frames, the indentations are dispersed at predetermined intervals along the members, corresponding to a variety of traditional frame and filter sizes. Alternatively, the members of the grid may be equipped with other frame interlocks such as pincher-like grippers or projections. In use, the filter and grid are trimmed to the desired size and the frame is adjusted so that the frame flanges engage the corresponding indentations on the grids.

An advantage of the inventive grid and frame system is that it may be easily adjusted and secured without the use of small detachable parts. Because the system employs a series of grid interlocks that engage flanges on the frame, there is no need for keeper pins or other similar devices.

This and other advantages will become apparent to one skilled in the art from the following detailed description of a preferred embodiment and from the drawings.

DETAILED DESCRIPTION OF THE INVENTION

Figure 1:
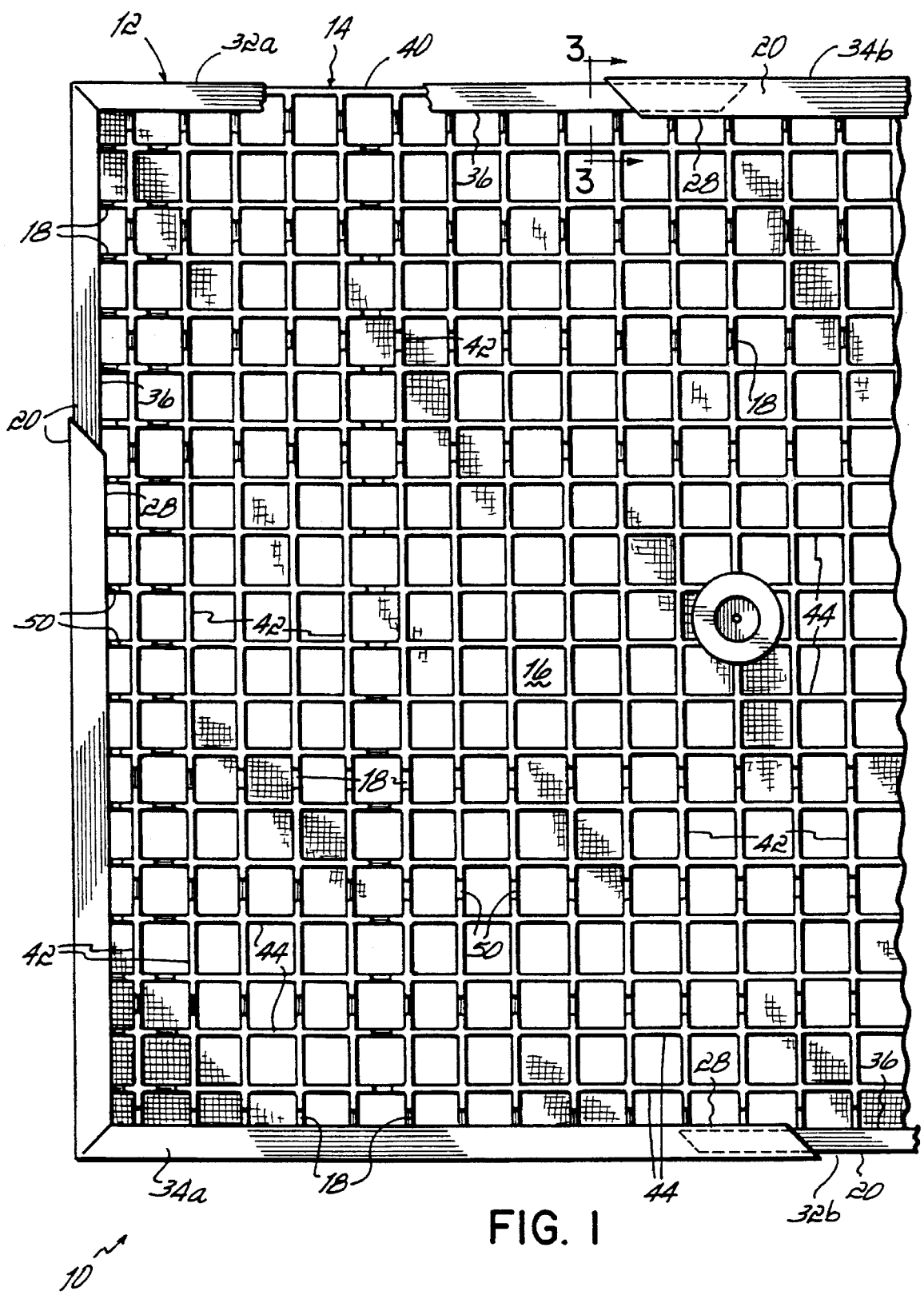
FIG. 1 is a partial plan view of one embodiment of the adjustable filter frame and grid system.

A filter frame and grid system built in accordance with the principles of the present invention is shown in FIG. 1. The system 10 includes a frame 12 in interlocking engagement with a grid 14, whereby the system 10 is adapted to support a filter 16.

Figure 3:
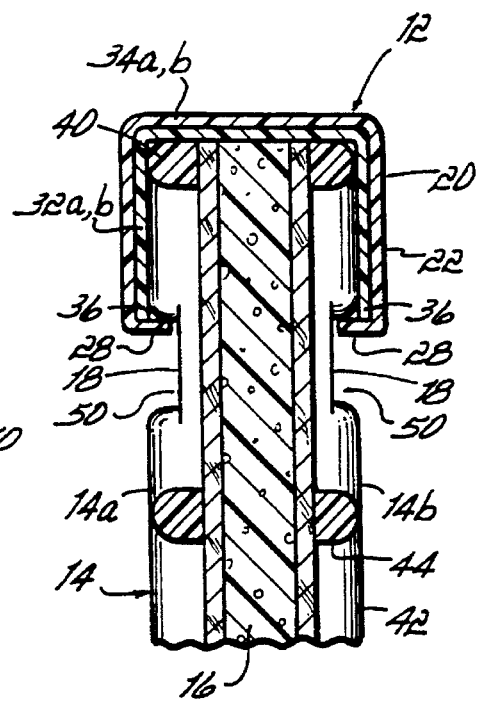
FIG. 3 is a partial transverse cross-sectional view taken on line 3—3 of FIG. 1 of two grids housing a filter and held together by an adjustable filter frame.

As shown in FIG. 3, the frame 12 includes a channel member 20 having a U-shaped sidewall 22 terminating in flanges 28. Preferably the frame 12 is an adjustable frame, although the frame 12 may have a fixed length and width if desired. The adjustable frame 12 may include two channel members 20 allowing adjustment of the frame in one dimension, and more preferably includes four channel members 20 allowing adjustment of the frame 12 in both length and width.

As shown in FIG. 1, the adjustable frame 12 includes four right angle channel members 20. Two of the channel members 32a, 32b are slightly smaller in width than the other two channel members 34a, 34b, and have straight edges 36 as shown in FIG. 3. Channel members 34a, 34b are slightly larger in width than members 32a, 34b, and have a U-shaped sidewall 22 terminating in flanges 28 as shown in FIG. 3. Thus, channel members 32a, 32b may be slidably received within channel members 34a, 34b to form a frame 12 that is adjustable in both length and width as shown in FIGS. 1 and 3.

The flanges 28 on channel members 34a, 34b serve the dual purpose of supporting the straight edges 36 of the channel members 32a, 32b as well as interlocking with a grid or grids 14. In the preferred embodiment of the invention, the frame 12 is adapted to hold a filter 16 centered between two grids 14a, 14b as shown in FIG. 3. Alternatively, the frame 12 may be adapted to interlock with a single grid 14 to support a filter 16 by using a channel member 20 with a more narrow U-shaped opening, or by using a filter 16 having a greater thickness to compensate for the absence of a second grid 14.

Figure 2:
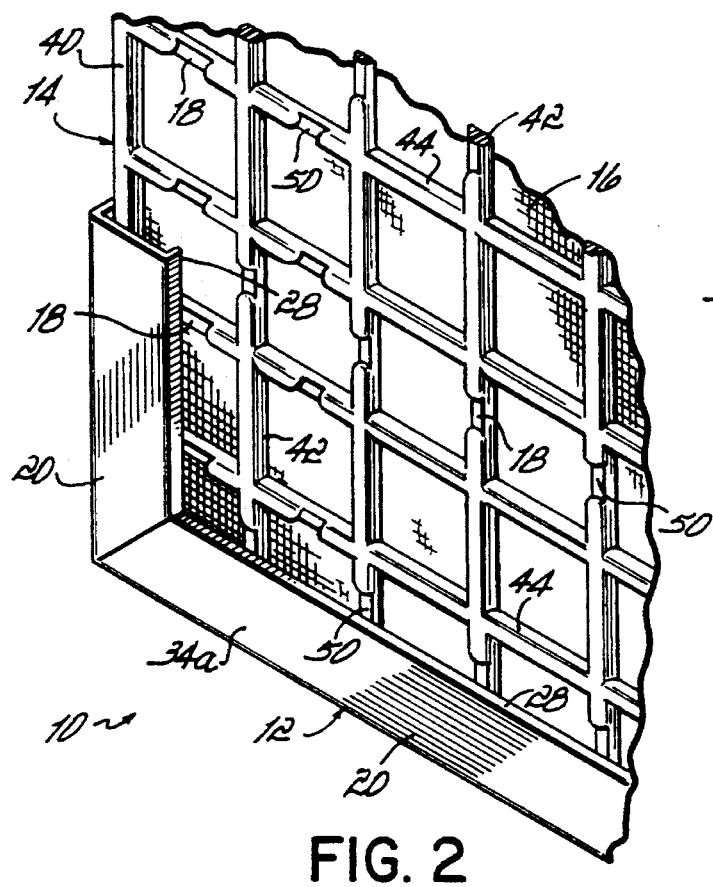
FIG. 2 is a perspective view of a portion of the filter frame and grid system shown in FIG. 1.

As shown in FIGS. 1 and 2, the grid 14 preferably includes a border member 40 and vertical members 42 and horizontal members 44 that intersect with each other to provide a rigid grid 14. Alternatively, the grid 14 may be constructed without a border member 40 or with fewer vertical members 42 and/or fewer horizontal members 44. If desired, a grid 14 according to the principles of this invention may be formed with a single member extending across at least one of the length and width of the frame 12.

As shown in FIGS. 1 and 2, several of the vertical and horizontal members 42, 44 are provided with interlocks 18 for engaging the flanges 28 of the frame 12. An interlock may be any depression, projection or other formation on a grid member, adapted to engage a flange on the U-shaped sidewall of a frame. Preferably, the interlocks 18 are indentations 50 as shown in FIGS. 1 through 3. Each indentation 50 is deep enough to securably engage a flange 28 of the frame 12, and in the preferred embodiment, each indentation has a depth of about 1.5 min. In order to properly interlock with the indentations 50, the flanges 28 need to be long enough to support the straight edges 36 of the channel members 32a, 32b and to engage the interlocks 18 of the frame 12, and in the preferred embodiment, these flanges 28 are about 2 mm. in length (see FIG. 3). The indentations 50 are placed at predetermined positions along each member 42, 44, and preferably, these indentations 50 are positioned on members 42, 44 so that the flanges 28 on the frame 12 are capable of engaging the indentations 50 when the frame 12 is adjusted to accommodate known standard filter frame sizes. Preferably the indentations are located to interlock with a frame 12 for filters sized at 16"×20", 16"×25", 20"×20", 20"×25" and 25"×30". If desired, an indentation may be placed between adjacent intersections of members 42, 44 of the grid 14 to give the user maximum flexibility in adjusting the size of the grid 14 and frame 12.

Figure 4:
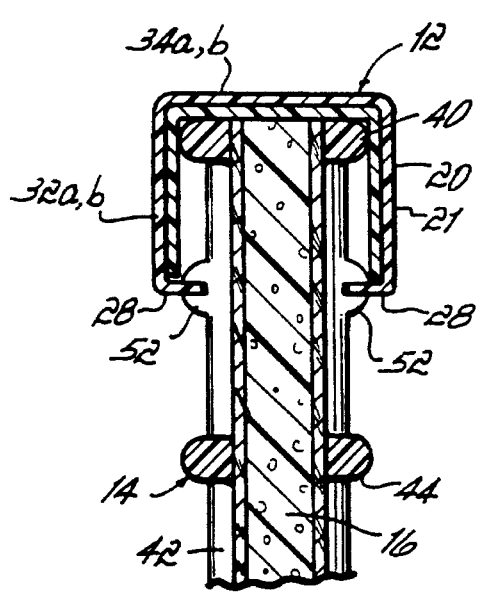
FIG. 4 is a cross-sectional view of a portion of another embodiment of the filter frame and grid system showing interlocks in the form of pincher-like grippers.
Figure 5:
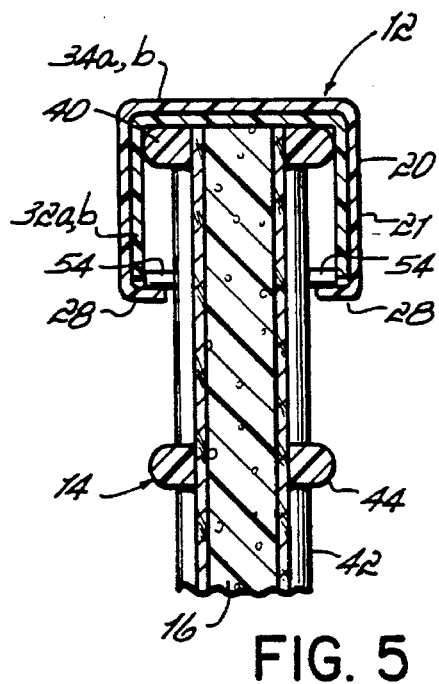
FIG. 5 is a cross-sectional view of a portion of a further embodiment of the filter frame and grid system showing interlocks in the form of projections.

Although the interlocks 18 preferably are indentations 50, other interlocks 18 may be used so long as they are capable of engaging a flange 28 on the frame 12. For example, interlocks 18 may be pincher-like grippers 52 as shown in FIG. 4 or projections 54 as shown in FIG. 5. Each pincher-like gripper 52 includes a pair of arms extending out from the surface of the grid 14 and toward one another. The projections 54 extend outward from the grid 14, and may be any of a number of different shapes such as cylinders and the like.

In its fully assembled form, the preferred adjustable filter frame and grid system 10 includes a filter 16, a front grid 14a and rear grid 14b on either side of the filter 16, and an adjustable frame 12 interlocking with the grids 14a, 14b about the filter 16 as shown in FIG. 3. To assemble or adjust the system 10, the user determines the filter size for a particular heating or cooling unit and cuts the filter 16 to the appropriate length and width. Once the filter 16 is properly sized, the user may trim the front and rear grids 14a, 14b to correspond to the filter size. Once the filter 16 and grids 14a, 14b have been trimmed to the proper size, the filter 16 is placed between the two grids 14a, 14b (FIG. 3).

The adjustable frame 12 is formed by sliding the ends of channel members 32a, 32b within members 34a, 34b (FIG. 1). Initially, two frame halves may be formed. For example, members 32a and 34a may be joined together, with members 32b and 34b being similarly joined. The length of the two members 32a, 34a may be adjusted by pushing the member 32a further into the member 34a or by pulling the two members in opposite directions in a telescoping fashion, and the frame half formed by members 32b, 34b may be adjusted in a similar fashion.

At this point, the user-sized grid-filter sandwich is urged into one half of the adjustable filter frame 12, for example, the frame half formed from channel member 32a and channel member 34a (FIG. 1). One of the flanges 28 on the U-shaped sidewall 22 of channel member 34a is held slightly outward by the user until a portion of both the front and rear grids 14a, 14b is received within the channel member 34a. At that point, the user simply pushes the grid-filter-grid sandwich further into the cavity formed by the U-shaped sidewalls 22 of the channel members 32a, 34a until the flanges 28 snap into the indentations 50 of the grids 14a, 14b. At that point, the grids 14a, 14b and frame half formed by members 32a, 34a are held in place because the flanges 28 on outer channel member 34a engage indentations 50 on each of the grids 14a, 14b (FIG. 3).

To complete the adjustable filter frame and grid system, the remaining frame half formed by members 32b, 34b is slidably mounted into its proper position. For example, the exposed end of channel member 32b is slidably mounted within the exposed end of channel member 34a, and the exposed end of channel member 32a is slidably mounted within the exposed end of channel member 34b. As the two frame halves are pushed together, one of the flanges 28 on the U-shaped sidewall 22 of channel member 34b is held slightly outward until a portion of both the front and rear grids 14a, 14b is received within the channel member 34b. At that point, the two frame halves may be pushed closer together until the flanges 28 on the second frame half engage the indentations 50 of the grids 14a, 14b (FIG. 1).

This invention is not limited to the detailed description discussed above, but is intended to cover modifications and equivalent arrangements included within the spirit and scope of the appended claims.

What is claimed is:

1. A filter frame and grid system, comprising:

a) a channel member having a U-shaped sidewall and first and second ends, said first and second ends being joined to one another to form a frame having a length and width, said U-shaped sidewall terminating in a flange; and b) a grid comprising a plurality of intersecting members extending across at least one of said length and width of said frame, wherein one of said intersecting member has first and second ends and a plurality of interlocks, one of said interlocks being proximate said first end and a second one of said interlocks being proximate said second end so that said flange engages said interlocks proximate said first and second ends of said one of said intersecting members to secure said frame to said grid.

2. The system of claim 1, wherein said frame is an adjustable frame and said grid is sizable, said interlocks being distributed along said one of said intersecting members of said grid at predetermined locations so that said grid may be sized to engage said adjustable frame for different filter sizes.

3. The system of claim 2, wherein said adjustable frame has four frame sections allowing said frame to be adjusted in both length and width.

4. The system of claim 3, wherein another of said intersecting members has a plurality of interlocks distributed along its length at predetermined locations for engaging said flange, said interlocks being distributed along said intersecting members so that said frame engages said interlocks to accommodate standard filter sizes of 16"×20", 16"×25", 20"×20", 20"×25" and 25"×30".

5. The system of claim 2, wherein said interlocks are indentations.

6. The system of claim 2, wherein said interlocks are pincher shaped grippers.

7. The system of claim 2, wherein said interlocks are projections.

8. A grid for holding a filter within a frame having a width and a length, the grid comprising:
   a plurality of intersecting members extending across at least one of the length and width of the frame, each of said members having first and second ends; and
   at least two indentations in at least one of said plurality of intersecting members, one of said indentations being proximate said first end of said one member and a second one of said indentations being proximate said second end of said one member so that the frame engages said indentations proximate said first and second ends of said one member to secure the filter within the frame and grid.

9. A grid as recited in claim 8, further comprising:
   a plurality of members extending across said other one of said width and length of said frame so that said plurality of members intersects said first plurality of intersecting members to provide a supporting structure, each of said plurality of members having first and second ends.

10. A grid as recited in claim 9, wherein said plurality of members includes at least two indentations in at least one of said plurality of members, one of said indentations being proximate said first end of said one member and a second one of said indentations being proximate said second end of said one member so that said frame engages said indentations proximate said first and second ends of said one of said plurality of members to secure the filter within the frame and grid.

11. A grid as recited in claim 10, wherein each of said first plurality of intersecting members and each of said plurality of members includes at least two indentations, one of said indentations being proximate said first end of each of said members and a second one of said indentations being proximate said second end of each of said members.

12. A grid as recited in claim 11, wherein:
   said indentations proximate each of said first ends of said plurality of intersecting members being aligned with each other and said indentations proximate each of said second ends of said plurality of intersecting members being aligned with each other; and
   said indentations proximate each of said first ends of said plurality of members being aligned with each other and said indentations proximate each of said second ends of said plurality of members being aligned with each other.

13. A filter frame and grid system, comprising:
   a frame having a first channel member and a second channel member, each of said first and second channel members having a U-shaped side wall terminating in a flange, said first and second channel members slidingly connected to each other to form a frame having a length and width, said frame being adjustable in one of said length and width; and
   a grid comprising a first member extending across at least one of said length and width of said frame, said first member having first and second ends and first and second interlocks, said first interlock being proximate said first end and said second interlock being proximate said second end so that said flanges engage said first and second interlocks to secure said frame to said first member in said one of said length and width.

14. The system of claim 13 wherein said first member includes a plurality of additional interlocks distributed along said first member at predetermined locations, whereby said grid may be trimmed to a desired size and said frame may be adjusted in said one of said length and width so that said flanges engage the corresponding interlocks of said first member.

15. A filter frame and grid system, comprising:
   a frame having first and second right angle channel members having a U-shaped side wall terminating in a flange and third and fourth right angle channel members having a U-shaped side wall, said third and fourth right angle channel members slidingly connected to said first and second right angle channel members to form a frame having a length and width and being adjustable in both said length and width; and
   a grid comprising a first member extending across at least one of said length and width of said frame, said first member having first and second ends and first and second interlocks, said first interlock proximate said first end and said second interlock proximate said second end so that said flanges engage said first and second interlocks to secure said frame to said first member in at least one of said length and width.

16. The system of claim 15 further including a second member intersecting said first member, said second member extending across the other one of said length and width.

17. The system of claim 16 wherein said second member has first and second ends and first and second interlocks, said first interlock being proximate said first end and said second interlock being proximate said second end, whereby said first and second interlocks of said second member engage said flanges of said first and second right angle channel members thereby securing said frame to said second member in the other one of said length and width.

18. The system of claim 17 wherein said first member and second member both include a plurality of additional interlocks distributed at predetermined locations, whereby said grid may be trimmed to a desired size and said frame may be adjusted in said length and width so that said flanges engage the corresponding interlocks of said trimmed grid.

* * * * *

UNITED STATES PATENT AND TRADEMARK OFFICE
CERTIFICATE OF CORRECTION

PATENT NO. : 5,476,526
DATED : December 19, 1995
INVENTOR(S) : Attermeyer

It is certified that error appears in the above-indentified patent and that said Letters Patent is hereby corrected as shown below:

In col. 3, line 30, delete "1.5 min." and insert -- 1.5 mm -- therefor.

Col. 4, line 55, delete "member" and insert -- members -- therefor.

Col. 5, line 33, after "said" delete "first".

Col. 5, line 45, after "said" delete "first".

Signed and Sealed this

Fourteenth Day of May, 1996

Attest:

BRUCE LEHMAN

Attesting Officer *Commissioner of Patents and Trademarks*